United States Patent
Atia et al.

(10) Patent No.: US 10,320,707 B2
(45) Date of Patent: Jun. 11, 2019

(54) SPREADING QUALITY OF SERVICE VALUES OVER A GIVEN RANGE WITH MINIMAL DEVIATION

(71) Applicant: INTERNATIONAL BUSINESS MACHINES CORPORATION, Armonk, NY (US)

(72) Inventors: Ohad Atia, Haifa (IL); Amalia Avraham, Petach Tikva (IL); Isaac Beckman, Lehavim (IL); Alon Marx, Matan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 249 days.

(21) Appl. No.: 15/339,256

(22) Filed: Oct. 31, 2016

(65) Prior Publication Data
US 2018/0123972 A1 May 3, 2018

(51) Int. Cl.
*H04L 12/927* (2013.01)
*H04L 12/24* (2006.01)
*H04L 29/08* (2006.01)

(52) U.S. Cl.
CPC ........ *H04L 47/805* (2013.01); *H04L 41/5045* (2013.01); *H04L 47/803* (2013.01); *H04L 67/1097* (2013.01); *H04L 41/5096* (2013.01)

(58) Field of Classification Search
CPC .. G06F 3/067; G06F 11/3034; G06F 11/3409; G06F 11/3419; G06F 11/3442; G06F 11/3485; G06F 12/0223; G06F 17/30289; G06F 17/30306; G06F 2201/81; G06F 2201/875; G06F 2201/88; G06F 3/06; G06F 3/0605; G06F 3/061; G06F 3/0614; G06F 3/0631; G06F 3/0643; G06F 3/0665; G06F 3/0689; G06F 9/4881; H04L 41/5022; H04L 43/16; H04L 47/803; H04L 47/805; H04L 67/1097; H04L 41/5067; H04L 65/80; H04L 47/24; H04L 43/08; H04L 41/50; H04L 41/5038; H04L 43/0876; H04L 12/1432; H04L 41/5003;
(Continued)

(56) References Cited

U.S. PATENT DOCUMENTS 8,085,713 B2  12/2011  Kang
8,904,146 B1  12/2014  Lazar
(Continued)

FOREIGN PATENT DOCUMENTS

EP  1737167 A1  12/2006

OTHER PUBLICATIONS

Chen et al., "User-QoS-based Web Service Clustering for QoS Prediction," 2015 IEEE International Conference on Web Services, 2015 (8 pages).

*Primary Examiner* — Hitesh Patel
*Assistant Examiner* — Sandarva Khanal
(74) *Attorney, Agent, or Firm* — Griffiths & Seaton PLLC

(57) ABSTRACT

Embodiments for performance management in a computing storage environment. In a storage system having a predetermined number of available quality of service (QoS) values associated with a performance of the storage system, the predetermined number of available QoS values are spread over a range such that a user requested QoS value is matched with one of the available QoS values within an optimal deviation value to a given precision.

6 Claims, 7 Drawing Sheets

(58) Field of Classification Search
CPC . H04W 24/10; H04W 28/20; H04W 72/0453; H04W 72/1205; H04W 28/24; H04W 28/0268; H04W 28/18
See application file for complete search history.

(56) References Cited

U.S. PATENT DOCUMENTS

| | | | |
|---|---|---|---|
| 9,836,246 B2* | 12/2017 | Yamauchi | G06F 3/061 |
| 2005/0182747 A1* | 8/2005 | Nakamoto | G06F 9/4881 |
| 2008/0270483 A1 | 10/2008 | Kumar et al. | |
| 2015/0199388 A1 | 7/2015 | Hrischuk et al. | |
| 2017/0188267 A1* | 6/2017 | Palanisamy | H04W 28/24 |
| 2018/0198716 A1* | 7/2018 | Karthikeyan | H04L 41/5022 |

* cited by examiner

SPREADING QUALITY OF SERVICE VALUES OVER A GIVEN RANGE WITH MINIMAL DEVIATION

BACKGROUND OF THE INVENTION

Field of the Invention

The present invention relates in general computing systems, and more particularly to, various embodiments for performance management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems to store information and data. As wide strides in technological advancement relating to data access devices have been accomplished, there is an ever-growing demand for growth and development within the back end supporting systems that provide and store the data content.

SUMMARY OF THE INVENTION

Various embodiments for performance management in a computing storage environment, by a processor are provided. In one embodiment, by way of example only, a method comprises, in a storage system having a predetermined number of available quality of service (QoS) values associated with a performance of the storage system, spreading the predetermined number of available QoS values over a range such that a user requested QoS value is matched with one of the available QoS values within an optimal deviation value to a given precision.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
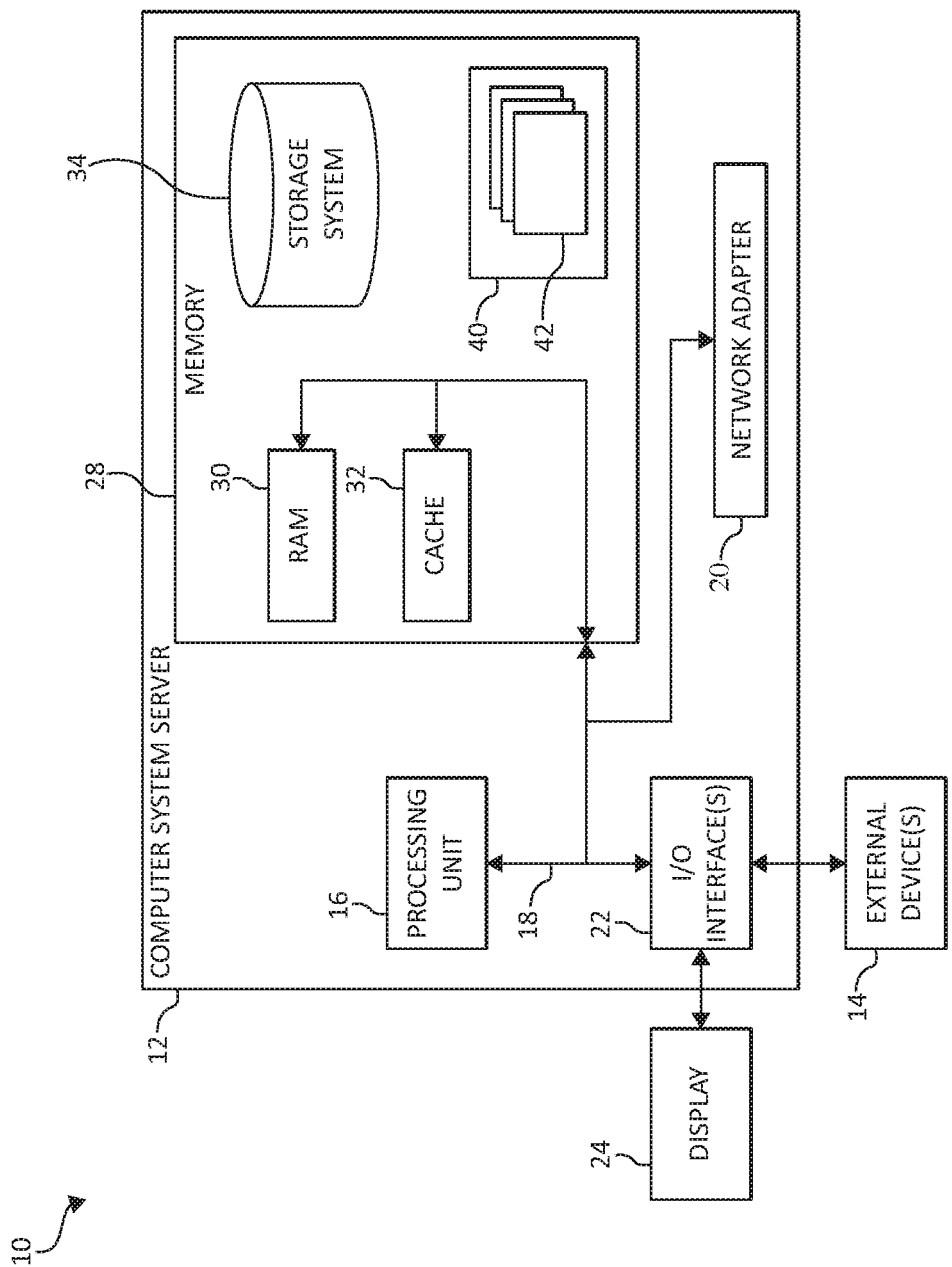
FIG. 1 is a block diagram depicting an exemplary cloud computing node according to an embodiment of the present invention.

In computer storage and networking, the vast majority of network devices process device requests indiscriminately. That is, regardless of the identity of the requestor or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requesters receive different levels of treatment depending upon administratively defined policies. In that regard, a service level agreement (SLA) can specify a guaranteed level of responsiveness associated with particular content or services irrespective of any particular requester. By comparison, quality of service (QoS) terms specify a guaranteed level of responsiveness minimally owed to particular requestors.

The policy based service differentiation model is the logical result of several factors. Firstly, the number and variety of computing applications which generate requests across networks both private and public has increased dramatically in the last decade. Each of these applications, however, has different service requirements and differentiated business values. Secondly, technologies and protocols that enable the provision of different services having different levels of security and QoS have become widely available. Yet, access to these different specific services must be regulated because these specific services can consume important computing resources such as network bandwidth, memory and processing cycles. Finally, business objectives or organizational goals can be best served when discriminating between different requests rather than treating all requests for computer processing in a like manner.

Thus, in computing storage systems, the QoS feature allows the storage system to deliver different service levels to hosts that are connected to the same system. The QoS feature favors performance of critical business applications that run concurrently with noncritical applications. Because the storage system disk and cache are generally shared among all applications and all hosts are attached to the same resources, division of these resources among both critical and noncritical applications might have an unintended adverse performance effect on critical applications. QoS can address this by limiting the rate, based on bandwidth and input/output operations per second (TOPS), for non-critical applications. Limiting performance resources for non-critical applications means that the remaining resources are available without limitation for the business-critical applications.

However, the number of storage volumes in a given scenario has become much larger than the number of QoS values the storage system is able to support. For example, there generally is a limitation of listed QoS values (e.g. a few hundred) supported by the storage system, while a much larger number of storage volumes (e.g. several thousand) having un-predetermined values exist which must be defined as requested by users. In other words, when a user requests certain QoS values, these requested values must be matched within a minimal deviation to the pre-set listing of QoS values supported by the storage system as to provide an accurate and efficient product to the user.

Accordingly, to improve upon the art, the mechanisms of the present invention implement such functionality as spreading the values in the list of pre-set QoS values (e.g. the list of several hundred pre-set QoS values supported by the storage system) in such a way that each QoS value requested by a user can be matched with a pre-set QoS value with as minimal deviation from the requested value as possible.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
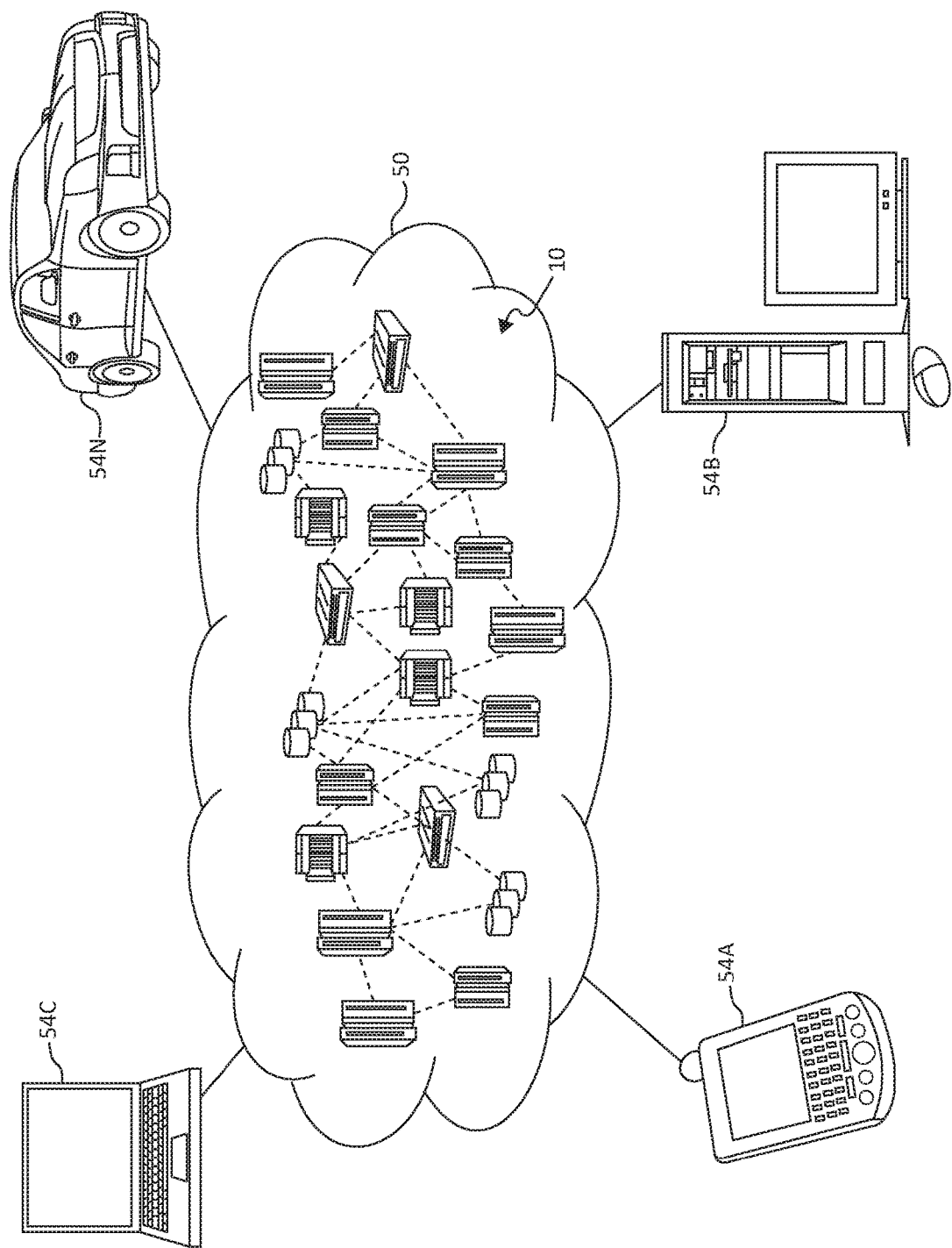
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
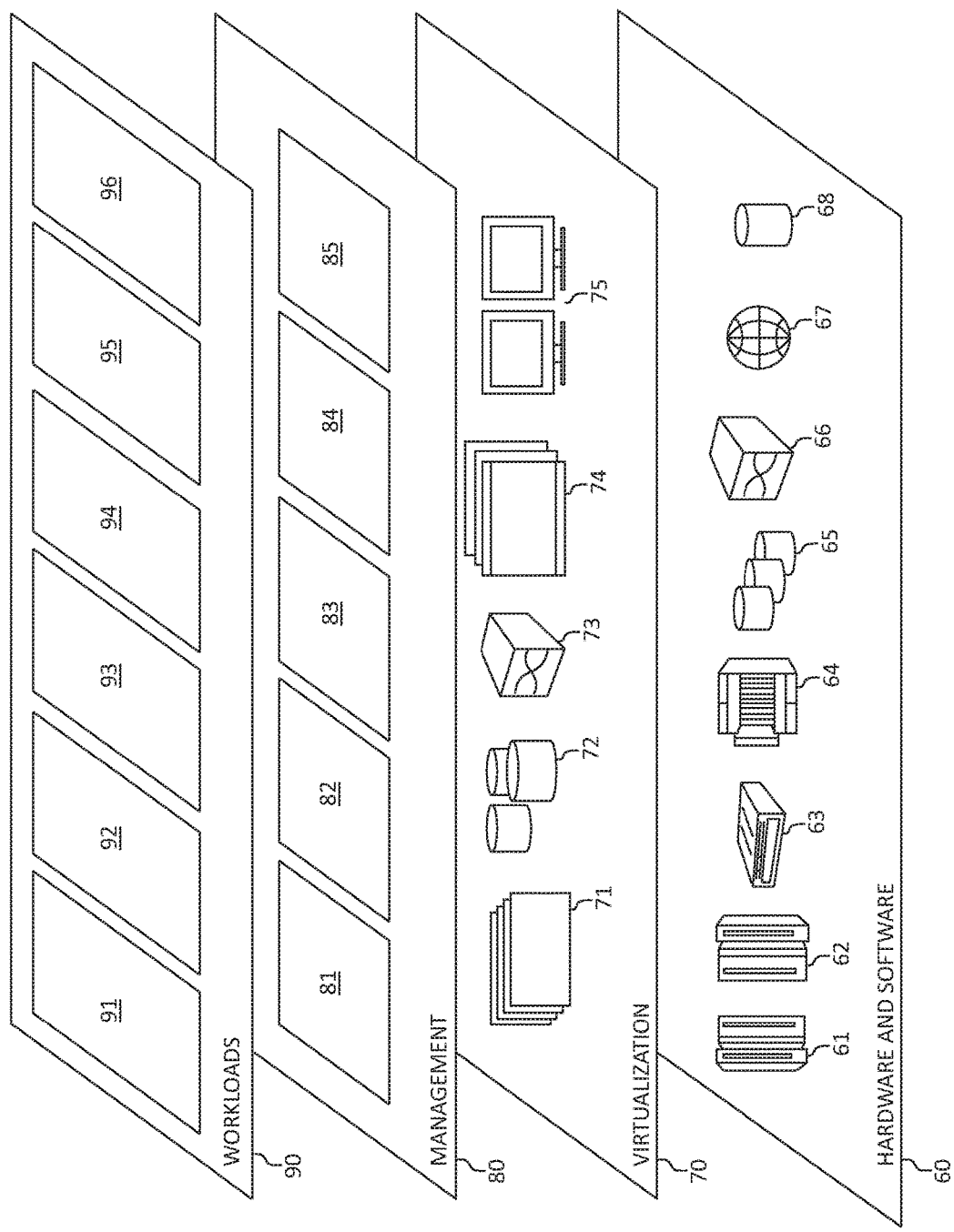
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 96, such as antivirus scanning workloads, or anti-malware scanning workloads. In addition, data security workloads and functions 96 may include such operations as data quarantining and/or data deleting functions. One of ordinary skill in the art will appreciate that the data security workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
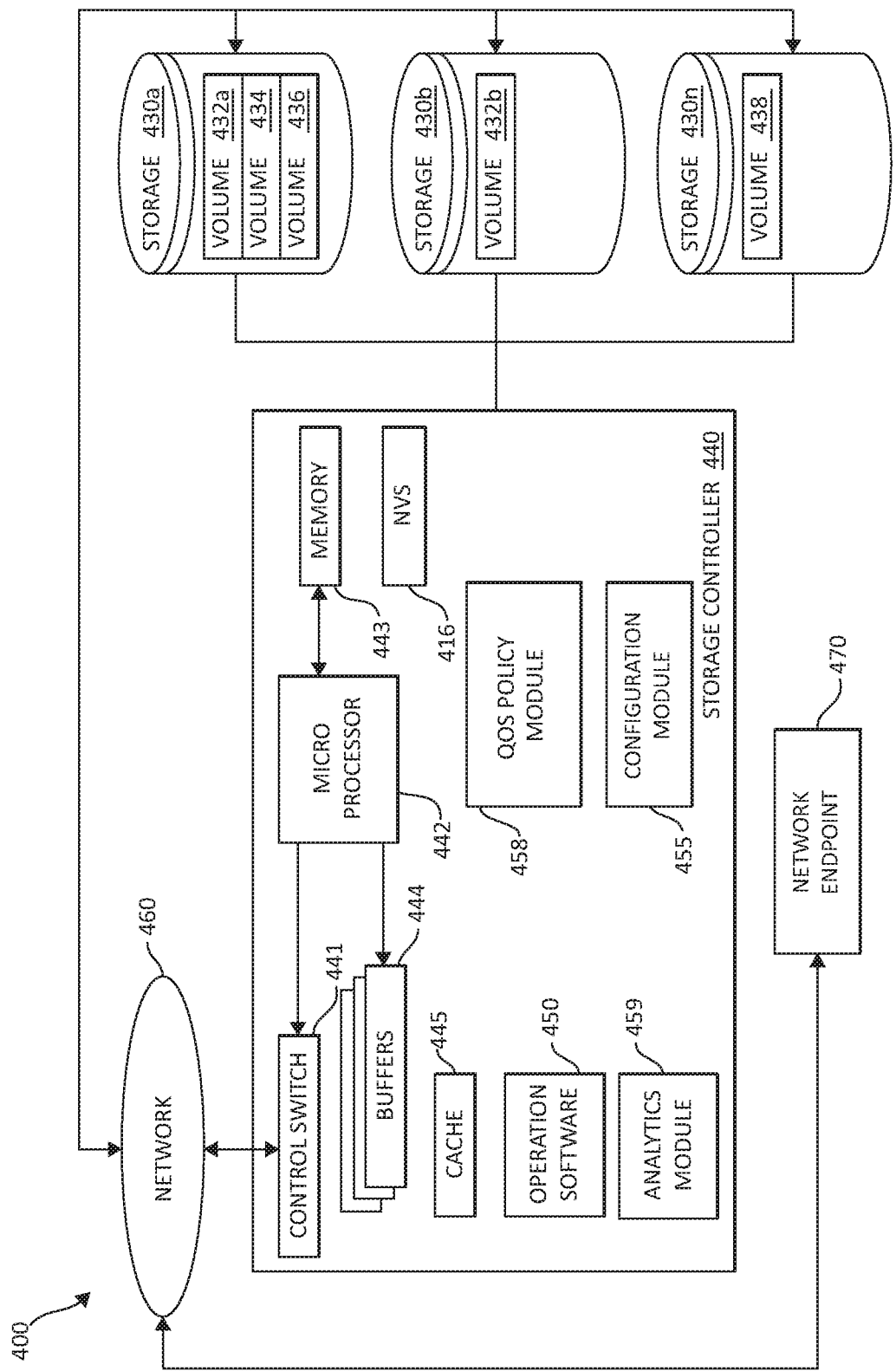
FIG. 4 is an additional block diagram depicting an exemplary hardware structure of a computing storage system in communication with the cloud computing environment, in which aspects of the present invention may be realized.

FIG. 4, following, is an additional block diagram showing a hardware structure of a data management system 400 that may be used in the overall context (i.e., as a portion of a distributed computing environment) of performing functionality according to various aspects of the present invention.

Network 460 may be a fibre channel (FC) fabric, a fibre channel point-to-point link, a fibre channel over Ethernet (FCoE) fabric or point to point link, a FICON or ESCON I/O interface, any other I/O interface type, a wireless network, a wired network, a LAN, a WAN, heterogeneous, homogeneous, public (i.e. the Internet), private, or any combination thereof. The ISP may provide local or distributed data among one or more locations and may be equipped with any type of fabric (or fabric channel) (not shown in FIG. 4) or network adapter 460 to the storage controller 440, such as Fibre channel, FICON, ESCON, Ethernet, fiber optic, wireless, or coaxial adapters. Network management system 400 is accordingly equipped with a suitable fabric (not shown in FIG. 4) or network adaptor 460 to communicate.

To facilitate a clearer understanding of the methods described herein, storage controller 440 is shown in FIG. 4 as a single processing unit, including a microprocessor 442, system memory 443 and nonvolatile storage ("NVS") 416. It is noted that in some embodiments, storage controller 440 is comprised of multiple processing units, each with their own processor complex and system memory, and interconnected by a dedicated network 460 within data storage system 400.

In a local or remote location, yet connected over network 460, storage 430 (labeled as 430a, 430b, and 430n herein) may be comprised of one or more storage devices, such as storage arrays, which are connected to storage controller 440 (e.g., by a storage network) as shown.

In some embodiments, the devices included in storage 430 may be connected in a loop architecture. Storage controller 440 manages storage 430 and facilitates the processing of write and read requests intended for storage 430. The system memory 443 of storage controller 440 stores program instructions and data, which the processor 442 may access for executing functions and method steps of the present invention for executing and managing storage 430 as described herein. In one embodiment, system memory 443 includes, is in association with, or is in communication with the operation software 450 for performing methods and operations described herein. As shown in FIG. 4, system memory 443 may also include or be in communication with a cache 445 for storage 430, also referred to herein as a "cache memory," for buffering "write data" and "read data," which respectively refer to write/read requests and their associated data. In one embodiment, cache 445 is allocated in a device external to system memory 443, yet remains accessible by microprocessor 442 and may serve to provide additional security against data loss, in addition to carrying out the operations as described herein.

In some embodiments, cache 445 is implemented with a volatile memory and non-volatile memory and coupled to microprocessor 442 via a local bus (not shown in FIG. 4) for enhanced performance of data storage system 400. The NVS 416 included in data storage controller 440 is accessible by microprocessor 442 and serves to provide additional support for operations and execution of the present invention as described in other figures. The NVS 416, may also be referred to as a "persistent" cache, or "cache memory" and is implemented with nonvolatile memory that may or may not utilize external power to retain data stored therein. The NVS 416 may be stored in and with the cache 445 for any purposes suited to accomplish the objectives of the present invention. In some embodiments, a backup power source (not shown in FIG. 4), such as a battery, supplies NVS 416 with sufficient power to retain the data stored therein in case of power loss to data storage system 400. In certain embodiments, the capacity of NVS 416 is less than or equal to the total capacity of cache 445.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 4 may include a logical volume, or simply "volume," may have different kinds of allocations. Storage 430a, 430b and 430n are shown as ranks in data storage system 400, and are referred to herein as rank 430a, 430b and 430n. Ranks may be local to data storage system 400, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

A network endpoint 470 is connected through the network 460 as shown. The network endpoint 470 is generically intended to refer to any number of network devices, such as a switch, a router, a wireless access point, or another device known generally to one of ordinary skill in the art. As will be further illustrated in the following figures, a user may use a networked device, (e.g., a device connected to network 460) to access the network 460. The networked device may include computers, tablets, smartphones, television set top boxes, televisions and other video equipment, or even a household appliance such as a refrigerator or a garage door opener, again as one of ordinary skill in the art will appreciate. Ultimately any device having communicative ability to and through network 460 is anticipated to use the network endpoint 470. In one embodiment, the depiction of a network endpoint 470 serves to provide a point where an input object (data object) is introduced into a distributed computing environment, as will be described.

The storage controller 440 may include a configuration module 455 and a QoS policy module 458, among other functional components. The configuration module 455 and QoS policy module 458 may operate in conjunction with each and every component of the storage controller 440, and storage devices 430. The configuration module 455 and QoS policy module 458 may be structurally one complete module or may be associated and/or included with other individual modules. The configuration module 455 and QoS policy module 458 may also be located at least partially in the cache 445 or other components, as one of ordinary skill in the art will appreciate.

The configuration module 455 and QoS policy module 458 may individually and/or collectively perform various aspects of the present invention as will be further described. For example, the configuration module 455 may perform various system configuration operations in accordance with aspects of the illustrated embodiments, such as configuring the storage controller 440 to operate using a given set of definitional information, for example. The QoS policy module 458 may enforce I/O rate limiting policies within and between various storage components and/or nodes. The analytics module 459 may use data analytics to identify, organize, create, delete, sequester, or perform other actions on various patterns, trends, and other characteristics identified in the tracked and scanned data over the network 460 and between other distributed computing components in a distributed computing environment. As one of ordinary skill in the art will appreciate, each respective aforementioned module may make up only a subset of various functional and/or functionally responsible entities in the data storage system 400.

Other ancillary hardware may be associated with the storage system 400. For example, as shown, the storage controller 440 includes a control switch 441, a microprocessor 442 for controlling all the storage controller 440, a nonvolatile control memory 443 for storing a microprogram (operation software) 450 for controlling the operation of storage controller 440, data for control, cache 445 for temporarily storing (buffering) data, and buffers 444 for assisting the cache 445 to read and write data, a control switch 441 for controlling a protocol to control data transfer to or from the storage devices 430, the configuration module 455, QoS policy module 458, or other blocks of functionality, in which information may be set. Multiple buffers 444 may be implemented with the present invention to assist with the operations as described herein.

Figure 5:
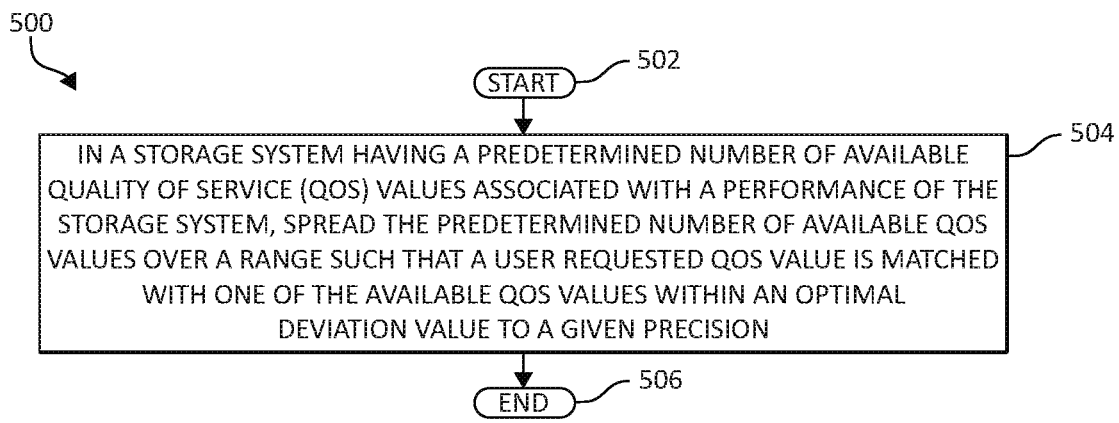
FIG. 5 is a flowchart diagram illustrating an exemplary method for performance management in a computing storage environment by a processor, by which aspects of the present invention may be implemented.

Continuing, FIG. 5 illustrates a method 500 for performance management in a computing storage environment, in accordance with one embodiment of the present invention. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) by, in a storage system having a predetermined number of available quality of service (QoS) values associated with a performance of the storage system, spreading the predetermined number of available QoS values over a range such that a user requested QoS value is matched with one of the available QoS values within an optimal deviation value to a given precision (step 504). The method 500 ends (step 506).

As aforementioned, the present invention implements functionality to spread the values in the list of pre-set QoS values (e.g. the list of several hundred pre-set QoS values supported by the storage system) in such a way that each QoS value requested by a user can be matched with a pre-set QoS value with as minimal deviation from the requested value as possible. When using the algorithms herein to spread the QoS values, the QoS values will be denser in a lower portion of the domain and sparser in a higher portion of the domain (i.e. the range between a lower limit/bound and a higher limit/bound of the QoS values within the pre-set list). This is accomplished by limiting a deviation value between each of the QoS values to a certain or predetermined percentage. A repetitive calculation is used to find the optimal deviation value to a given precision.

Figure 6:
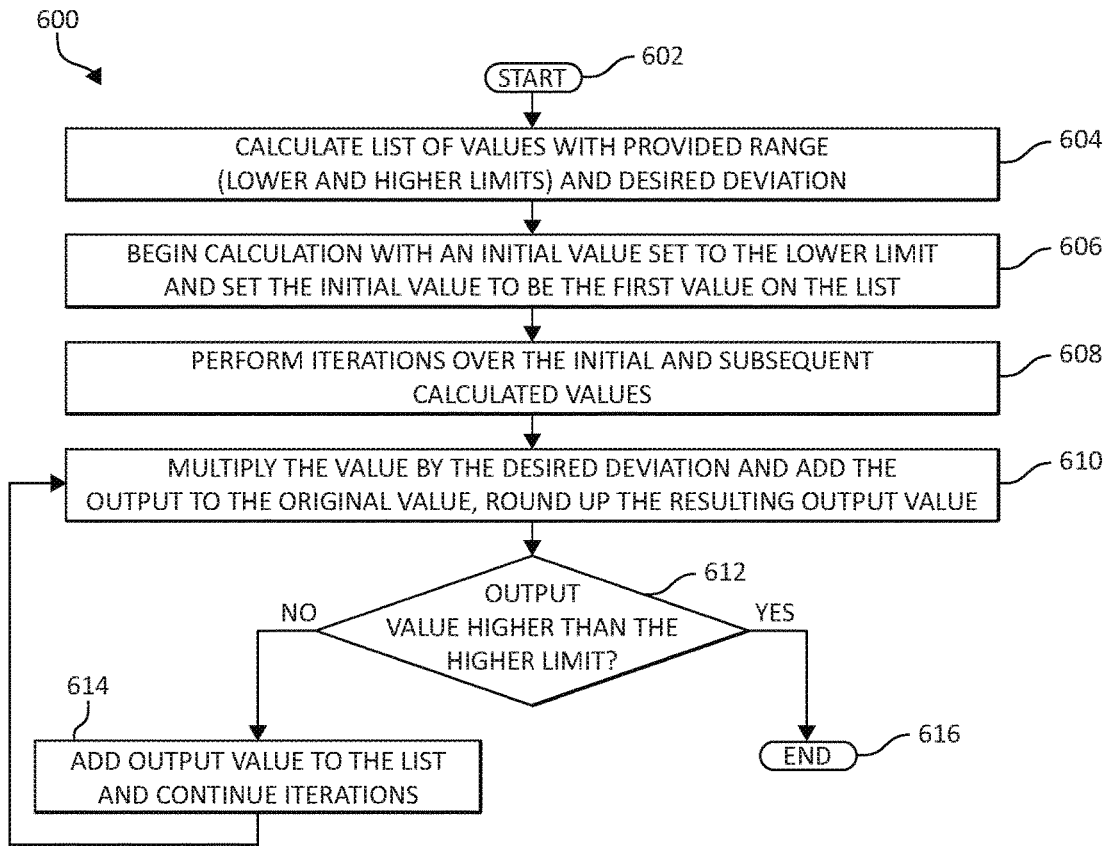
FIG. 6 is an additional flowchart diagram illustrating an exemplary method for performance management in a computing storage environment by a processor, by which aspects of the present invention may be implemented.

FIG. 6 illustrates a method 600 for performance management in a computing storage environment, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The method 600 begins (step 602) by calculating a list of QoS values after having been provided a range of values (lower and higher limits or bounds) and a desired deviation value (step 604). The calculation begins with a value set to the lower limit or bound wherein the initial value is set to be the first QoS value on the list (step 606). Following, an iteration calculation is performed to generate the remaining values on the list (step 608).

For each beginning value (both the initial value and subsequent iterations thereafter), the value is multiplied by the desired deviation value, the output of which is added to the beginning value. This output value is rounded up to a certain degree (e.g. a whole value, half value, etc.) (step 610). A determination is then made whether the resulting output value is higher than the higher limit or bound of the list (step 612). If the resulting output value is not higher than the higher limit or bound of the list, the resulting output value is added as a QoS value to the list (step 614), and iterations continue to generate the remaining values on the list (step 610). If, at step 612, the resulting output value is higher than the higher limit or bound of the list, the method 600 ends (step 616).

Figure 7:
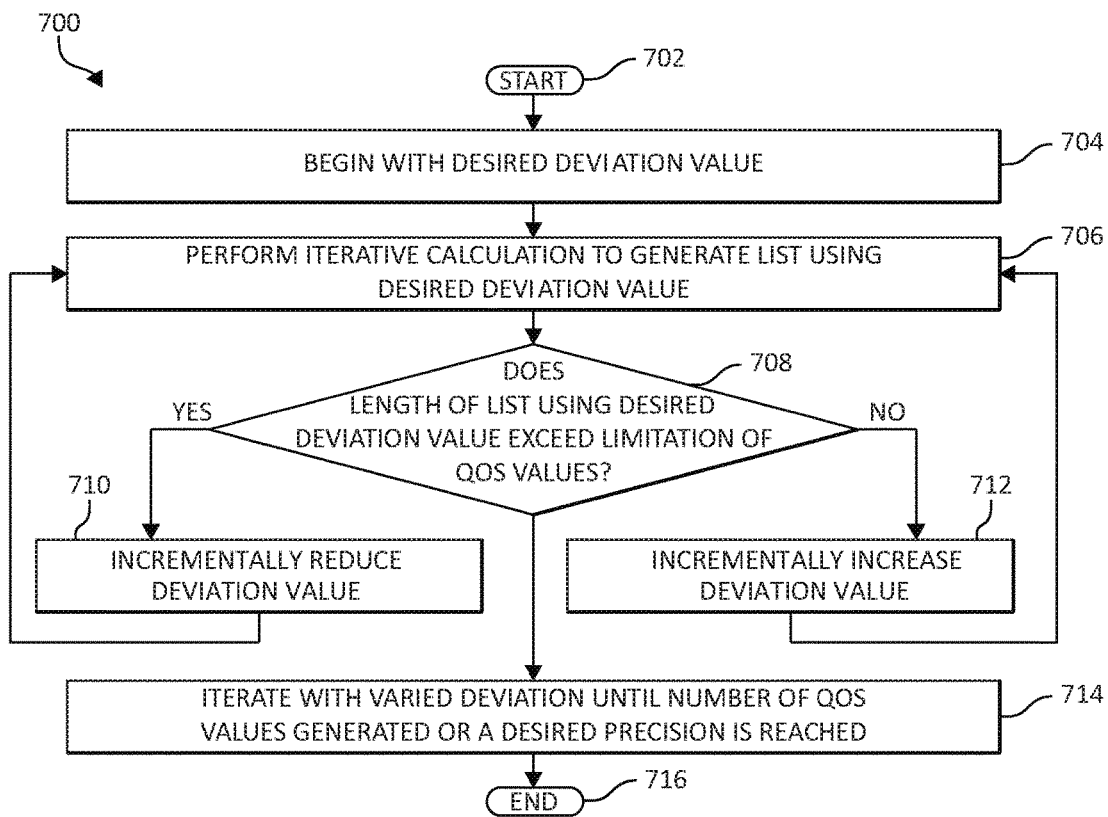
FIG. 7 is an additional flowchart diagram illustrating an exemplary method for performance management in a computing storage environment by a processor, by which aspects of the present invention may be implemented.

FIG. 7 illustrates a method 700 for performance management in a computing storage environment for performing iterations in association with the method 600, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins (step 702) with specifying a desired deviation value (step 704) wherein the desired deviation value is used as input in the iterative calculation performed in the method 600 (step 706). In performing the iterative calculation in the method 600, a determination is made whether using the specified desired deviation value results of the elements of the list exceeds the limitation of QoS values of the storage system (step 708). If using the specified desired deviation results in the length of the elements in the list exceeding the limitation of QoS values set by the storage system, the desired deviation value is incrementally reduced (step 710) and the reduced desired deviation value is used as input to perform the iterative calculation of the method 600 (step 706).

If, at step 708, using the specified desired deviation does not result in the length of the elements in the list exceeding the limitation of QoS values set by the storage system (i.e. the number of elements in the list is less than the available number of QoS values limited by the storage system), the desired deviation value is incrementally increased (step 712) and the increased desired deviation value is used as input to perform the iterative calculation of the method 600 (step 706).

The iteration of the calculation performed in the method 600 is continued using the varied deviation value (either incrementally increasing the desired deviation value or incrementally decreasing the desired deviation value) until either an exact number of elements (values) on the list corresponds with the QoS values limited by the storage system, or a desired precision is reached (step 714). The calculated QoS values are then used to match a user requested QoS value in the storage system to one of the determined QoS values within a deviation of such at the given precision. The method 700 ends (step 716).

An example of computer code used to effectuate the methodology discussed in FIG. 5 and FIG. 6 is provided hereinbelow. Of course, one of ordinary skill in the art would readily recognize that the provided computer code is merely a sample for aide in understanding the mechanisms of the present invention, and may be tailored to the specific implementation of the functionality presented herein. Thus, in one embodiment, the computer code may comprise:

```
import sys
import math
base = 1.03
initial_value = 1.0
MAXIOPS = 10000000
def nextvalue(value, base):
    nvalue = value * base
    if round(nvalue) == math.floor(value):
        return nextvalue(nvalue, base)
    else:
        return round(nvalue)
def produce_list(initial_value, max_value, base, amount):
    value_list = [ ]
    value = initial_value
    for i in xrange(amount):
    value = int(nextvalue(value, base))
        if value >= MAXIOPS:
            # print 'reached MAX TOPS'
            return value_list
        value_list.append(value)
    return value_list
def print_list(value_list):
    index = 0
    for val in value_list:
        print '{index}: {value }'.format(index=index, value=value)
        index += 1
if __name__=="__main__":
```

-continued

```
if len(sys.argv) > 1:
    base = float(sys.argv[1])
print 'Increments of {inc}:'.format(inc=base)
value_list = produce_list(initial_value, MAXIOPS, base, 512)
print 'List includes {elements} elements ending at value {last}'.format(
    elements=len(value_list), last=value_list[-1])
```

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for performance management in a computing storage system comprising a storage controller which is connected to a plurality of storage devices via a network, the method comprising:
   in the computing storage system having a predetermined number of available quality of service (QoS) values associated with a performance of the computing storage system, responsive to a user requested QoS value for a requested service, spreading, by the storage controller, the predetermined number of available QoS values over a range such that the user requested QoS value is matched with one of a number of available QoS values within a determined deviation value of a selected threshold of deviation of the one of the number of available QoS values;
   pursuant to performing a repetitive calculation to obtain the determined deviation value, performing an initial calculation to generate a list of values to become the number of available QoS values using a lower bound and a higher bound of the range, and a desired deviation value; wherein:
      upon an output of the list of values generated by the initial calculation having more values than the predetermined number of available QoS values, the desired deviation value is reduced;
      upon the output of the list of values generated by the initial calculation having fewer values than the predetermined number of available QoS values, the desired deviation value is increased; and
      wherein the initial calculation is iteratively performed using either the reduced desired deviation value or the increased desired deviation value until a number of elements on the output of the list of values generated corresponds with the predetermined number of available QoS values associated with a performance of the computing storage system;
   in response to performing the repetitive calculation, matching the user requested QoS value for the requested service to one of the number of available QoS values within the determined deviation value of the selected threshold of deviation of the one of the available QoS values so as to provide an accurate and efficient service to the user; and
   implementing the user requested service based on the matched user requested QoS value to one of the number of available QoS values.

2. The method of claim 1, further including limiting the determined deviation value between each of the number of available QoS values to a certain percentage.

3. A system for performance management in a computing storage system comprising a storage controller which is connected to a plurality of storage devices via a network, the system comprising:
   a hardware processor executing instructions stored in a memory, wherein the hardware processor:
      in the computing storage system having a predetermined number of available quality of service (QoS) values associated with a performance of the computing storage system, responsive to a user requested QoS value for a requested service, spreads the predetermined number of available QoS values over a range such that the user requested QoS value is matched with one of a number of available QoS values within a determined deviation value of a selected threshold of deviation of the one of the number of available QoS values;
      pursuant to performing a repetitive calculation to obtain the determined deviation value, performs an initial calculation to generate a list of values to become the number of available QoS values using a lower bound and a higher bound of the range, and a desired deviation value; wherein:
         upon an output of the list of values generated by the initial calculation having more values than the predetermined number of available QoS values, the desired deviation value is reduced;
         upon the output of the list of values generated by the initial calculation having fewer values than the predetermined number of available QoS values, the desired deviation value is increased; and
         wherein the initial calculation is iteratively performed using either the reduced desired deviation value or the increased desired deviation value until a number of elements on the output of the list of values generated corresponds with the predetermined number of available QoS values associated with a performance of the computing storage system;
      in response to performing the repetitive calculation, matches the user requested QoS value for the requested service to one of the number of available QoS values within the determined deviation value of the selected threshold of deviation of the one of the available QoS values so as to provide an accurate and efficient service to the user; and
      implements the user requested service based on the matched user requested QoS value to one of the number of available QoS values.

4. The system of claim 3, wherein the hardware processor limits the determined deviation value between each of the number of available QoS values to a certain percentage.

5. A computer program product for performance management in a computing storage system comprising a storage controller which is connected to a plurality of storage devices via a network, the computer program product embodied on a non-transitory computer-readable storage medium having computer-readable program code portions stored therein, the computer-readable program code portions comprising:
   an executable portion that, in the computing storage system having a predetermined number of available quality of service (QoS) values associated with a performance of the computing storage system, responsive to a user requested QoS value for a requested service, spreads the predetermined number of available QoS values over a range such that the user requested QoS value is matched with one of a number of available QoS values within a determined deviation value of a selected threshold of deviation of the one of the number of available QoS values;
   an executable portion that, pursuant to performing a repetitive calculation to obtain the determined deviation value, performs an initial calculation to generate a list of values to become the number of available QoS values using a lower bound and a higher bound of the range, and a desired deviation value; wherein:
      upon an output of the list of values generated by the initial calculation having more values than the predetermined number of available QoS values, the desired deviation value is reduced;

upon the output of the list of values generated by the initial calculation having fewer values than the predetermined number of available QoS values, the desired deviation value is increased; and wherein the initial calculation is iteratively performed using either the reduced desired deviation value or the increased desired deviation value until a number of elements on the output of the list of values generated corresponds with the predetermined number of available QoS values associated with a performance of the computing storage system;

an executable portion that, in response to performing the repetitive calculation, matches the user requested QoS value for the requested service to one of the number of available QoS values within the determined deviation value of the selected threshold of deviation of the one of the available QoS values so as to provide an accurate and efficient service to the user; and an executable portion that implements the user requested service based on the matched user requested QoS value to one of the number of available QoS values.

6. The computer program product of claim 5, further including an executable portion that limits the determined deviation value between each of the number of available QoS values to a certain percentage.

* * * * *